US011943295B2

(12) United States Patent
Ruflin et al.

(10) Patent No.: US 11,943,295 B2
(45) Date of Patent: Mar. 26, 2024

(54) SINGLE BI-DIRECTIONAL POINT OF POLICY CONTROL, ADMINISTRATION, INTERACTIVE QUERIES, AND SECURITY PROTECTIONS

(71) Applicant: Elasticsearch B.V., Mountain View, CA (US)

(72) Inventors: Nicolas Ruflin, Untersiggenthal (CH); Pier-Hugues Pellerin, Montreal (CA)

(73) Assignee: Elasticsearch B.V., Amsterdam (NL)

( * ) Notice: Subject to any disclaimer, the term of this patent is extended or adjusted under 35 U.S.C. 154(b) by 0 days.

(21) Appl. No.: 17/143,881

(22) Filed: Jan. 7, 2021

(65) Prior Publication Data

US 2021/0152636 A1 May 20, 2021

Related U.S. Application Data

(63) Continuation-in-part of application No. 16/379,356, filed on Apr. 9, 2019.

(51) Int. Cl.
*H04L 67/1097* (2022.01)
*H04L 67/101* (2022.01)
(Continued)

(52) U.S. Cl.
CPC ........ *H04L 67/1097* (2013.01); *H04L 67/101* (2013.01); *H04L 67/1044* (2013.01); *H04L 67/5682* (2022.05); *H04L 67/75* (2022.05)

(58) Field of Classification Search
CPC ............... H04L 67/1097; H04L 67/101; H04L 67/1044; H04L 67/2852; H04L 67/36; H04L 67/5682; H04L 67/75
See application file for complete search history.

(56) References Cited

U.S. PATENT DOCUMENTS 6,519,597 B1  2/2003  Cheng et al.
7,945,533 B2  5/2011  Krishnaprasad et al.
(Continued)

FOREIGN PATENT DOCUMENTS

CN  106528797 A  3/2017
CN  106934062 A  7/2017
(Continued)

OTHER PUBLICATIONS

"International Search Report" and "Written Opinion of the International Searching Authority," Patent Cooperation Treaty Application No. PCT/US2019/063437, dated Feb. 7, 2020, 8 pages.
(Continued)

*Primary Examiner* — John A Follansbee
*Assistant Examiner* — Zonghua Du
(74) *Attorney, Agent, or Firm* — Quinn IP Law

(57) ABSTRACT

Provided are methods and systems for configuring and managing data shipper agents. A method may commence with receiving a list of one or more data shipper agents installed on one or more edge nodes associated with a user. A data shipper agent of the one or more data shipper agents may be installed on one of the one or more edge nodes. The method may continue with providing a graphical user interface that may enable the user to configure the one or more data shipper agents. The method may further include receiving selections of configuration parameters associated with at least one of the one or more data shipper agents. The method may then continue with receiving a configuration of the at least one of the one or more data shipper agents and automatically reconfiguring the configuration of the at least one of the one or more data shipper agents.

16 Claims, 8 Drawing Sheets

(51) Int. Cl.
*H04L 67/104* (2022.01)
*H04L 67/5682* (2022.01)
*H04L 67/75* (2022.01)

(56) References Cited

U.S. PATENT DOCUMENTS

| | | | |
|---|---|---|---|
| 7,984,043 B1 | 7/2011 | Waas | |
| 8,352,519 B2 | 1/2013 | Nath | |
| 8,615,794 B1 | 12/2013 | Tomilson et al. | |
| 8,898,261 B1* | 11/2014 | Patsenker | H04L 41/046 709/220 |
| 8,930,332 B2 | 1/2015 | Burstein | |
| 9,015,301 B2 | 4/2015 | Redlich et al. | |
| 9,734,180 B1 | 8/2017 | Graham et al. | |
| 10,230,601 B1* | 3/2019 | Qin | H04L 43/045 |
| 10,528,599 B1 | 1/2020 | Pandis et al. | |
| 10,541,983 B1 | 1/2020 | Khashei Varnamkhasti et al. | |
| 10,558,541 B1* | 2/2020 | Chakkassery Vidyadharan | G06F 11/3006 |
| 10,769,148 B1 | 9/2020 | Binkert et al. | |
| 10,891,165 B2 | 1/2021 | Willnauer | |
| 10,997,204 B2 | 5/2021 | Leskes | |
| 11,182,093 B2 | 11/2021 | Leskes | |
| 11,188,531 B2 | 11/2021 | Leau | |
| 2005/0004892 A1 | 1/2005 | Brundage et al. | |
| 2005/0114397 A1* | 5/2005 | Doshi | H04L 41/0233 |
| 2005/0190695 A1* | 9/2005 | Phaal | H04L 43/065 370/229 |
| 2006/0075079 A1 | 4/2006 | Powers et al. | |
| 2006/0168195 A1* | 7/2006 | Maturana | H04L 41/046 709/224 |
| 2008/0027920 A1 | 1/2008 | Schipunov et al. | |
| 2009/0276215 A1 | 11/2009 | Hager | |
| 2010/0179940 A1 | 7/2010 | Gilder | |
| 2011/0134764 A1 | 6/2011 | Venkatapadmanaabhan | |
| 2011/0149745 A1 | 6/2011 | Filho et al. | |
| 2011/0282839 A1 | 11/2011 | Paksoy et al. | |
| 2012/0233118 A1 | 9/2012 | Holt et al. | |
| 2012/0233299 A1 | 9/2012 | Attanasio et al. | |
| 2012/0246297 A1* | 9/2012 | Shanker | H04L 67/289 709/224 |
| 2013/0086039 A1 | 4/2013 | Salch et al. | |
| 2013/0297469 A1 | 11/2013 | Spittle et al. | |
| 2014/0006330 A1 | 1/2014 | Biem | |
| 2014/0012814 A1 | 1/2014 | Bercovici et al. | |
| 2014/0157224 A1 | 6/2014 | Capuozzo et al. | |
| 2014/0188814 A1 | 7/2014 | Venkatrao et al. | |
| 2014/0279871 A1 | 9/2014 | Ochoa et al. | |
| 2014/0330785 A1 | 11/2014 | Isherwood et al. | |
| 2015/0280999 A1 | 10/2015 | Chart et al. | |
| 2015/0281355 A1 | 10/2015 | Maturana et al. | |
| 2015/0293955 A1* | 10/2015 | Dickey | G06F 16/245 707/741 |
| 2015/0379083 A1 | 12/2015 | Lang et al. | |
| 2016/0085839 A1 | 3/2016 | D'Halluin et al. | |
| 2016/0127517 A1* | 5/2016 | Shcherbakov | H04L 67/10 709/217 |
| 2016/0191509 A1 | 6/2016 | Bestler et al. | |
| 2016/0203168 A1 | 7/2016 | Gangadharappa | |
| 2016/0203174 A1 | 7/2016 | Shahane et al. | |
| 2016/0224600 A1 | 8/2016 | Munk | |
| 2016/0292171 A1 | 10/2016 | Bhagat et al. | |
| 2017/0011090 A1 | 1/2017 | Chen et al. | |
| 2017/0024453 A1 | 1/2017 | Raja et al. | |
| 2017/0078167 A1* | 3/2017 | Bansal | H04L 43/04 |
| 2017/0093640 A1 | 3/2017 | Subramanian et al. | |
| 2017/0124151 A1 | 5/2017 | Ji et al. | |
| 2017/0193041 A1 | 7/2017 | Fuchs | |
| 2017/0262551 A1 | 9/2017 | Cho et al. | |
| 2017/0371926 A1 | 12/2017 | Shiran et al. | |
| 2018/0081937 A1 | 3/2018 | Broecheler | |
| 2018/0189328 A1 | 7/2018 | Frazier et al. | |
| 2018/0268000 A1 | 9/2018 | McManus et al. | |
| 2019/0026336 A1 | 1/2019 | Tian | |
| 2019/0058649 A1* | 2/2019 | Qi | H04L 43/065 |
| 2019/0075080 A1 | 3/2019 | Entezari et al. | |
| 2019/0079974 A1 | 3/2019 | Goergens et al. | |
| 2019/0124105 A1* | 4/2019 | Chauhan | H04L 63/0218 |
| 2019/0266271 A1 | 8/2019 | Leau | |
| 2019/0268446 A1* | 8/2019 | Hsiao | H04L 69/22 |
| 2020/0050612 A1 | 2/2020 | Bhattacharjee et al. | |
| 2020/0084213 A1 | 3/2020 | Taropa | |
| 2020/0133550 A1 | 4/2020 | Willnauer | |
| 2020/0176098 A1 | 6/2020 | Lucas et al. | |
| 2020/0201879 A1 | 6/2020 | Leskes | |
| 2020/0229206 A1 | 7/2020 | Badic et al. | |
| 2020/0233692 A1* | 7/2020 | Kandula | H04L 67/34 |
| 2020/0326986 A1 | 10/2020 | Willnauer | |
| 2020/0328936 A1 | 10/2020 | Pérez-Aradros Herce et al. | |
| 2020/0348878 A1 | 11/2020 | Leskes | |
| 2021/0124620 A1 | 4/2021 | Willnauer | |
| 2021/0240731 A1 | 8/2021 | Leskes | |
| 2021/0357405 A1 | 11/2021 | Choi et al. | |
| 2022/0038353 A1* | 2/2022 | Yadav | H04L 43/0805 |
| 2022/0188336 A1 | 6/2022 | Sen | |

FOREIGN PATENT DOCUMENTS

| | | |
|---|---|---|
| EP | 3899710 A1 | 10/2021 |
| GB | 2592130 A | 8/2021 |
| WO | WO2020131330 A1 | 6/2020 |
| WO | 2021030524 A1 | 2/2021 |

OTHER PUBLICATIONS

Tedor, Jason, "Introduce Cross-Cluster Replication"; GitHub [online], Sep. 5, 2017 [retrieved Jan. 24, 2020], retrieved from the Internet: <https://github.com/elastic/elasticsearch/issues/30086>, 9 pages.

Kline, K., "SQL in a Nutshell", O'Reilly Media, Inc., Dec. 2000 [Retrieved on Jul. 28, 2020], Retrieved from the Internet: <https://learning.oreilly.com/library/view/sql-in-a/1565927443/>, 10 pages.

Bradford, Ronald, "SQL, ANSI Standards, PostgreSQL and MySQL", Retrieved from the Internet: <URL http://ronaldbradford.com/blog/sql-ansi-standards-postgresql-and-mysql-2015-03-26/, Mar. 26, 2015 [retrieved on Jun. 4, 2021], 33 pages.

"Can i use elasticsearch-sql to convert sql to DSL?", GitHub, Retrieved from the Internet: <URL https://github.com/NLPchina/elasticsearch-sql/issues/156>, Feb. 2016 [retrieved on Jul. 29, 2020], 4 pages.

Andhavarapu, Abhishek, "Beginners guide to querying Elasticsearch (Scoring vs Sorting)", Retrieved from the Internet: <URL https://abhishek376.wordpress.com/2017/07/06/begginers-guide-to-querying-elasticsearch/, Jul. 6, 2017 [retrieved on Jun. 4, 2021], 10 pages.

"Extended European Search Report", European Patent Application No. 21165715.0, dated Dec. 10, 2020, 7 pages.

"Office Action", British Patent Application No. GB 2104443.3, dated Aug. 16, 2021, 9 pages.

"Office Action", British Patent Application No. GB2105205.5, dated Oct. 4, 2021, 11 pages.

"Extended European Search Report", European Patent Application No. 21167941.0, dated Sep. 6, 2021, 10 pages.

* cited by examiner

Agent Policies 605

Use agent policies to manage agents and data that the agents collect

| Search 635 | | | | |
|---|---|---|---|---|
| Name 610 | Last Updated on 615 | Agents 620 | Integrations 625 | Action 630 |
| AWS Monitoring | Nov 25, 2020 | 1 agent | 2 | ... |
| endpoint config | Nov 12, 2020 | 2 agents | 2 | ... |
| default config | Nov 10, 2020 | 1 agent | 2 | ... |

[Reload] [Create agent policy]

< Cancel     <u>Agent policy</u>

Add data source
Select data sources for the agent policy

700

702 — ① Select a configuration

| Search for configuration |
| Windows |
| Default |
| ... |

705

707 — ② Select a data source

| Search for data source |
| Apache |
| ∨ AWS |
| Azure |
| Barracuda |
| Cisco |
| ... |

710

712 — ③ Select data to be collected

Settings
Choose a data source name a description

Name 715
[ aws-1 ]

Decsription 720   Optional
[ ]

> Advanced Options

725 — ☑ Collect logs from AWS instances
    Settings    Credential Profile Name   Optional
[ ]

☑ AWS CloudTrail logs    Queue URL
[ ]

730 — ☑ Collect metrics from AWS instances

735 — ☑ Core metrics    Period [ 10 s ]

740 — ☑ CPU metrics    Period [ 10 s ]

745 — ☑ Entropy metrics    Period [ 10 s ]

SINGLE BI-DIRECTIONAL POINT OF POLICY CONTROL, ADMINISTRATION, INTERACTIVE QUERIES, AND SECURITY PROTECTIONS

CROSS-REFERENCE TO RELATED APPLICATIONS

This application is a Continuation-in-part of, and claims the priority benefit of U.S. patent application Ser. No. 16/379,356 filed on Apr. 9, 2019, entitled "DATA SHIPPER AGENT MANAGEMENT AND CONFIGURATION SYSTEMS AND METHODS" and is related to U.S. patent application Ser. No. 17/143,014, filed on Jan. 6, 2021, entitled "SINGLE AGENT FOR LOGS, METRICS, TRACES, SYNTHETICS, SECURITY, AND END POINT MONITORING," which are incorporated herein by reference in their entirety.

FIELD

The present disclosure is directed to data processing and, more specifically, to managing and configuring data shipper agents residing on edge nodes.

BACKGROUND

Approaches to collecting data from, for example, a personal computer, cloud of an enterprise network, or web-based service, include collecting multiple types of data. Conventional data collection approaches utilize specific computer programs or applications for collecting specific types of data. For example, different software tools may be used for collecting log file data, metric data, and network data. To configure a collection of the required data, a user needs to have specific skills and spend a considerable amount of time to configure each data collection software tool. Specifically, the user may need to log into different data collection computer programs or applications and provide individual settings. Moreover, if multiple network machines need to be monitored, the user may need to configure data collection computer programs or applications on each network machine individually.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

Provided are methods and systems for configuring and managing data shipper agents. In some embodiments, a method for configuring and managing data shipper agents may commence with receiving a list of one or more data shipper agents installed on one or more edge nodes associated with a user. The method may continue with providing a graphical user interface (GUI) enabling the user to configure the one or more data shipper agents. The method may further include receiving, via the GUI, from the user, selections of configuration parameters associated with at least one of the one or more data shipper agents. The configuration parameters may represent one or more tasks assigned to the at least one of the one or more data shipper agents. The method may further include receiving a configuration of the at least one of the one or more data shipper agents. The configuration may be reconfigurable through the GUI using a configuration application programming interface (API). The method may continue with automatically reconfiguring the configuration of the at least one of the one or more data shipper agents based on the configuration parameters.

In some example embodiments, a system for configuring and managing data shipper agents may include a central agent management unit and a memory in communication with the central agent management unit. The central agent management unit may be configured to receive a list of one or more data shipper agents installed on one or more edge nodes associated with a user. A data shipper agent of the one or more data shipper agents may be installed on one of the one or more edge nodes. The central agent management unit may be further configured to provide a GUI. The GUI may be configured to enable the user to configure the one or more data shipper agents. The central agent management unit may be configured to receive, via the GUI, from the user, selections of configuration parameters associated with at least one of the one or more data shipper agents. The configuration parameters may represent one or more tasks assigned to the at least one of the one or more data shipper agents. The central agent management unit may be further configured to receive a configuration of the at least one of the one or more data shipper agents. The configuration may be reconfigurable through the GUI using a configuration API. The configuration of the at least one of the one or more data shipper agents may be automatically reconfigured based on the configuration parameters.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

FIG. 6 is a GUI of a system for configuring and managing data shipper agents, according to an example embodiment FIG. 7 is a GUI of a system for configuring and managing data shipper agents, according to an example embodiment.

DETAILED DESCRIPTION

Figure 1:
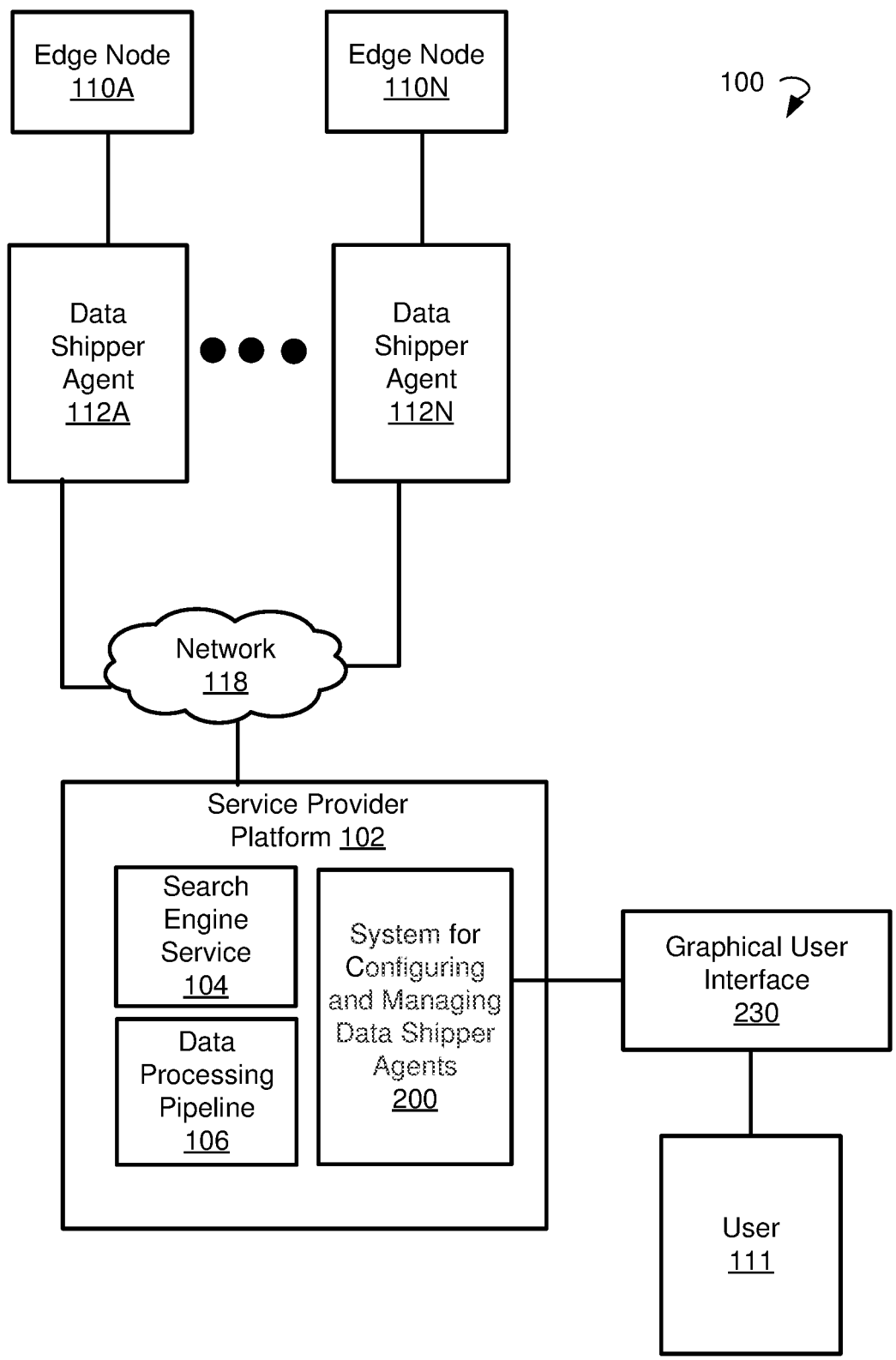
FIG. 1 is a schematic diagram of an example architecture within which methods and systems for configuring and managing data shipper agents can be implemented, according to an example embodiment.

The present disclosure relates generally to systems and methods for configuring and managing data shipper agents. In general, a data shipper agent is an object/service installed on an edge node of a network. The data shipper agent performs tasks at the edge node level and collects valuable data for use by a service provider platform. One data shipper agent can be implemented on an edge node and configured to collect multiple types of data related to various processes, programs, and applications running in the edge node. An edge node is a network machine or system on which the data shipper agent is residing. Collectively, multiple data shipper agents installed on edge nodes can transmit data from hundreds or thousands of network machines and systems to a service provider system such as Elasticsearch™. In some embodiments, data collected by the data shipper agents can be centralized in the service provider system.

A system for configuring and managing data shipper agents can include a graphical user interface (GUI) that allows users to configure a data shipper agent running on one edge node or simultaneously configure multiple data shipper agents on multiple edge nodes through a single application programming interface (API).

Managing collection of multiple types of data related to multiple services on an edge node and managing multiple data shipper agents running on multiple edge nodes can be a complicated task. The systems and methods for configuring and managing data shipper agents of the present disclosure can be utilized to alleviate these problems by setting multiple types of data to be collected and multiple tasks to be performed by the data shipper agent with respect to multiple programs, applications, and services running on the edge node.

Moreover, the systems and methods for configuring and managing data shipper agents can allow multiple data shipper agents to be configured by using a specifically configured GUI and/or specifically configured API calls. Specifically, the central management of data shipper agents can provide for automatic reconfiguration of one or more data shipper agents on one or more edge nodes based on the configuration of one data shipper agent. Once the configuration is modified for one data shipper agent running on one edge node, the resulting configuration changes can be used by the system for configuring and managing data shipper agents to automatically reconfigure data shipper agents running on other edge nodes.

A method for configuring and managing data shipper agents may commence with receiving a list of one or more data shipper agents installed on one or more edge nodes associated with a user. The method may further include providing a GUI to enable the user to configure the one or more data shipper agents. Upon providing the GUI, selections of configuration parameters associated with at least one of the one or more data shipper agents may be received, via the GUI, from the user. Each of the configuration parameters may represent one or more tasks assigned to the at least one of the one or more data shipper agents. Upon receiving the configuration parameters, a configuration of the at least one of the one or more data shipper agents may be retrieved. The configuration may be reconfigurable through the GUI using an API. Based on the configuration parameters provided by the user, the configuration of the at least one of the one or more data shipper agents may be automatically reconfigured.

Advantageously, the data shipper agent provides a unified way to add monitoring for logs, metrics, and other types of data to each edge node. A single data shipper agent makes it easier and faster to deploy monitoring across the entire infrastructure of a user. A unified policy of the data shipper agent makes it easier for the user to add integrations of new data sources for the data shipper agent. The GUI may include a web-based GUI that enables adding and managing integration of services and platforms into data sources monitored by the data shipper agent.

Referring now to the drawings, FIG. 1 is an example schematic diagram of an architecture 100 within which methods and systems for configuring and managing data shipper agents can be implemented. The architecture 100 may include a service provider platform 102 that includes a search engine service 104, a data processing pipeline 106, and a system 200 for configuring and managing data shipper agents also referred herein as a system 200. In general, the service provider platform 102 is configured to provide one or more services such as search engine or data visualization services based on data collected by data shipper agents.

The architecture 100 also includes edge nodes 110A-110N. Each of edge nodes 110A-110N can have one of data shipper agent 112A-112N running on the edge node. In one example, edge node 110A has a data shipper agent 112A installed thereon, while edge node 110N has a data shipper agent 112N installed thereon.

In some embodiments, the data shipper agent 112A may be installed on the edge node 110A and, in further example embodiment, may be running on a server, such as a cloud server, and may communicate with the edge node 110A via an API.

In general, the data processing pipeline 106 ingests data from multiple sources such as the one or more data shipper agents simultaneously and transforms the collected data into a format that is utilizable by either the system 200 for configuring and managing data shipper agents and/or the search engine service 104. Additionally, the components of the architecture 100 can communicate through an example network 118 that can include any public and/or private network.

In an example embodiment, the network 118 may include the Internet or any other network capable of communicating data between devices. Suitable networks may include or interface with any one or more of, for instance, a local intranet, a corporate data network, a data center network, a home data network, a Personal Area Network, a Local Area Network (LAN), a Wide Area Network (WAN), a Metropolitan Area Network, a virtual private network, a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network line, a dial-up port such as a V.90, V.34 or V.34bis analog modem connection, a cable modem, an Asynchronous Transfer Mode connection, or a Fiber Distributed Data Interface or Copper Distributed Data Interface connection.

Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System, cellular digital packet data, Research in Motion, Limited duplex paging network, Bluetooth radio, or an IEEE 802.11-based radio frequency network. The network 118 can further include or interface with any one or more of a Recommended Standard 232 (RS-232) serial connection, an IEEE-1394 (FireWire) connection, a Fiber Channel connection, an IrDA (infrared) port, a Small Computer Systems Interface connection, a Universal Serial Bus (USB) connection or other wired or wireless, digital or analog interface or connection, mesh or Digi® networking.

For context, each data shipper agent can be configured to collect a number of data types from an edge node. The data can include log file data, metric data, trace data, network data, event log data, audit data, uptime monitoring data, serverless shipper data, synthetic data, security data, and the like.

Generally, the system 200 is configured to provide a means for central configuration and management of one or more data shipper agents. In various embodiments, the configuration and management are accomplished through a GUI 230 enabling the configuring and managing of data shipper agents. A user 111 associated with one or more of edge nodes 110A-110N can use the GUI 230 for configuring and managing one or more data shipper agents running on the edge nodes 110A-110N.

Figure 2:
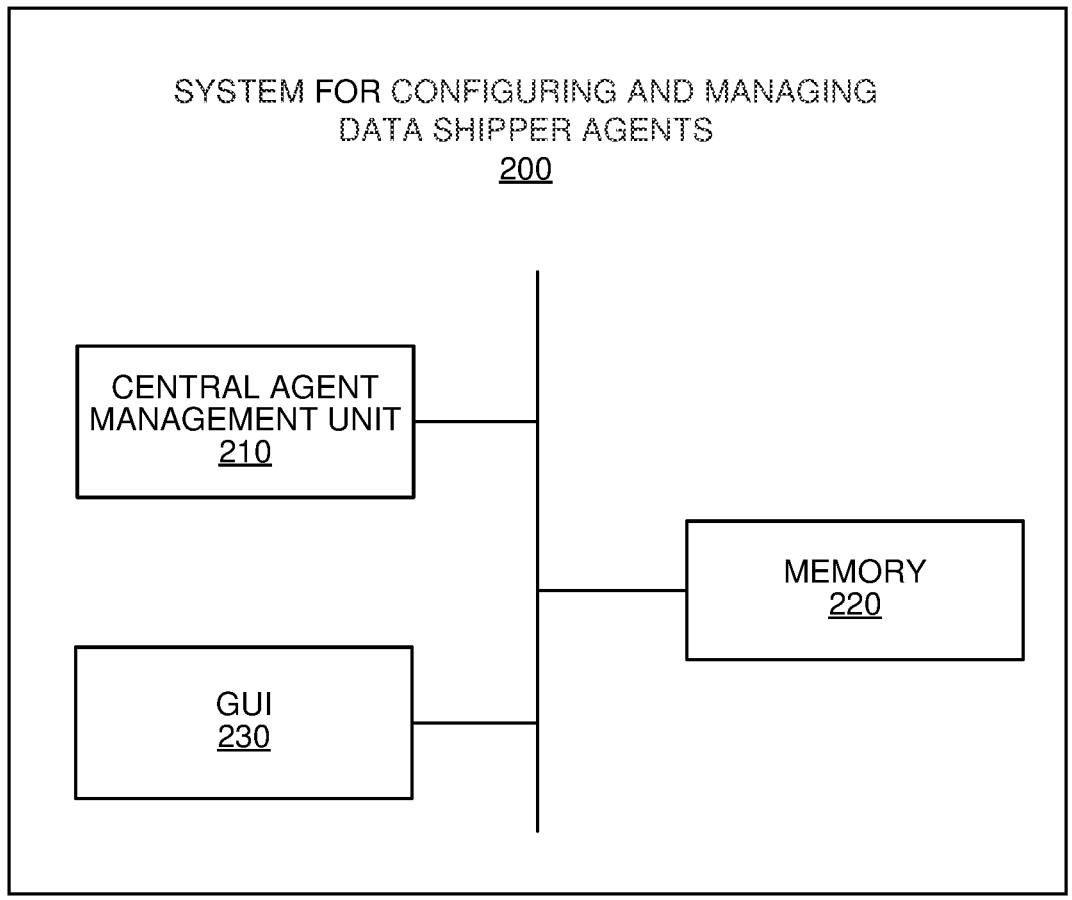
FIG. 2 is a block diagram illustrating a system for configuring and managing data shipper agents, according to an example embodiment.
Figure 8:
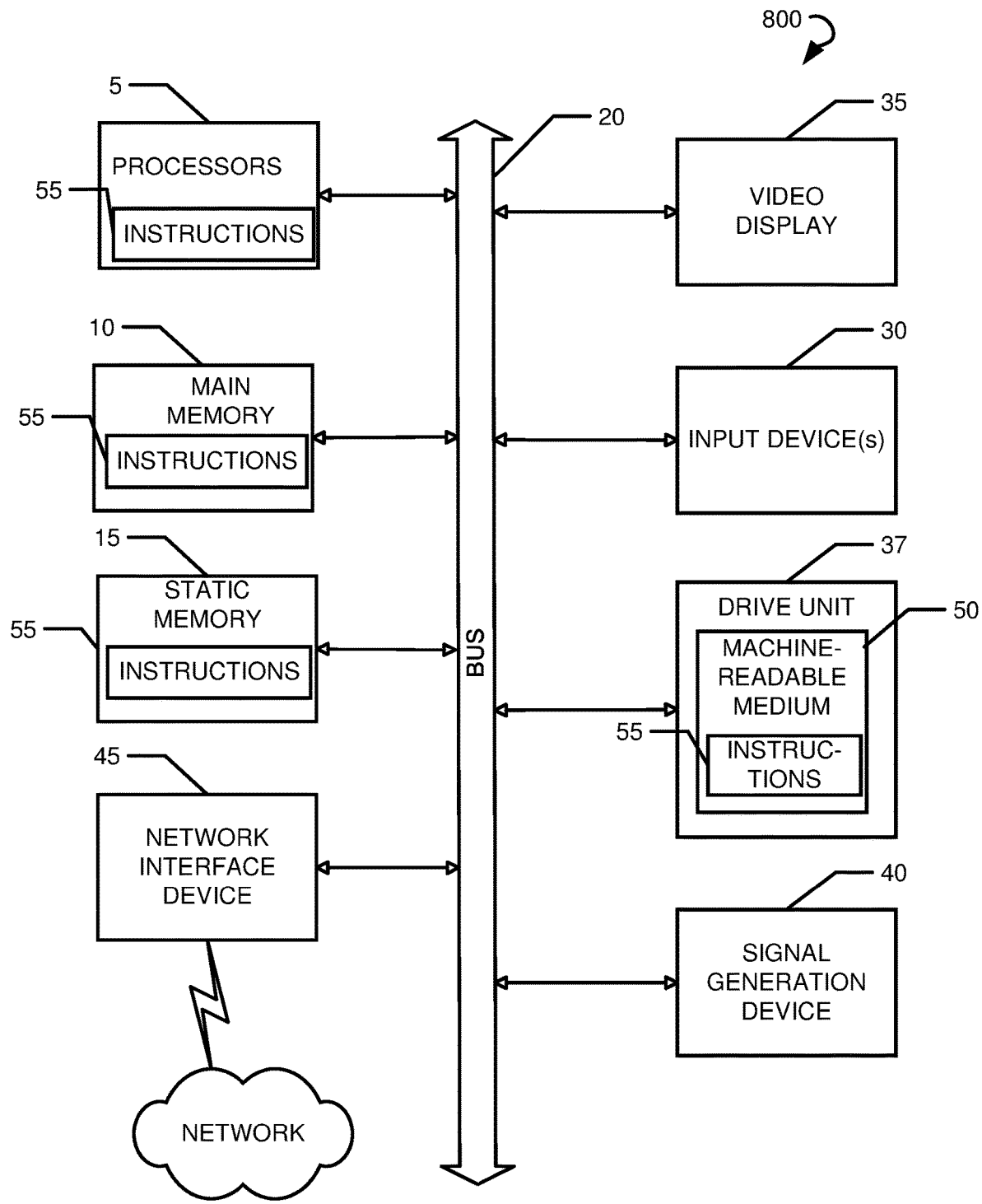
FIG. 8 is a computing system that can be used to implement a method for configuring and managing data shipper agents, according to an example embodiment.

FIG. 2 is a block diagram illustrating a system 200 for configuring and managing data shipper agents, according to an example embodiment. The system 200 may include a central agent management unit 210, a memory 220 in communication with the central agent management unit 210, and a GUI 230. In an example embodiment, the operations performed by the central agent management unit 210 and the GUI 230 may be performed by a processor and the memory 220 for storing instructions executable by the processor. Example one or more processors are shown in FIG. 8 as one or more processors 5. The operations performed by each of the central agent management unit 210, the memory 220, and the GUI 230 of the system 200 are described in more detail below with reference to FIG. 3.

Figure 3:
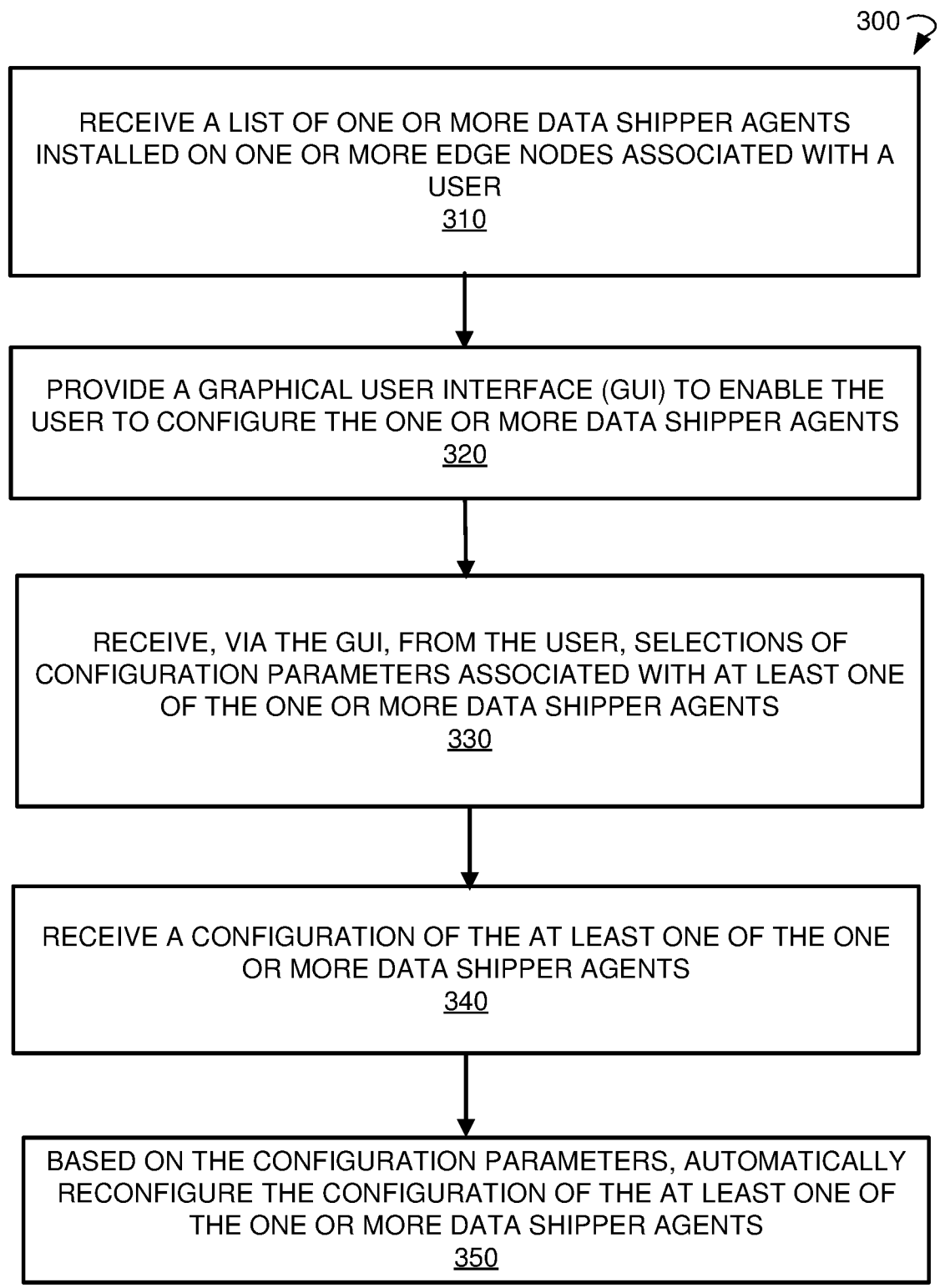
FIG. 3 shows a process flow diagram of a method for configuring and managing data shipper agents, according to an example embodiment.

FIG. 3 shows a process flow diagram of a method 300 for configuring and managing data shipper agents, according to an example embodiment. In some embodiments, the operations may be combined, performed in parallel, or performed in a different order. The method 300 may also include additional or fewer operations than those illustrated. The method 300 may be performed by processing logic that may include hardware (e.g., decision making logic, dedicated logic, programmable logic, and microcode), software (such as software run on a general-purpose computer system or a dedicated machine), or a combination of both.

The method 300 may commence with receiving, by a central agent management unit, a list of one or more data shipper agents at operation 310. The one or more data shipper agents may be installed on one or more edge nodes associated with a user. Each data shipper agent of the one or more data shipper agents may be installed on one of the one or more edge nodes.

At operation 320, the central agent management unit may provide a GUI. The GUI may enable the user to configure the one or more data shipper agents. The method 300 may continue with receiving, by the central agent management unit, via the GUI, selections of configuration parameters associated with at least one of the one or more data shipper agents from the user at operation 330. The configuration parameters may represent one or more tasks assigned to the at least one of the one or more data shipper agents.

In an example embodiment, receiving of the selections of the configuration parameters may include receiving selections of one or more policies associated with at least one of the one or more data shipper agents and, for each of the one or more policies, receiving the selections of the configuration parameters.

In an example embodiment, the at least one of the one or more data shipper agents may be configured to collect data from the one of the one or more edge nodes and provide the data to a service provider platform. Using the data collected by the at least one of the one or more data shipper agents, the service provider platform may provide one or more services with respect to the one or more edge nodes.

In an example embodiment, the data collected by the at least one of the one or more data shipper agents include at least one of log file data, metric data, trace data, network data, event log data, audit data, uptime monitoring data, serverless shipper data, synthetic data, security data, custom logs, and so forth.

At operation 340, the central agent management unit may receive a configuration of the at least one of the one or more data shipper agents. The configuration may be reconfigurable through the GUI using a configuration API. Based on the configuration parameters, the central agent management unit may automatically reconfigure the configuration of the at least one of the one or more data shipper agents at operation 350. The data to be collected by the at least one of the one or more data shipper agents may be set in the configuration of the at least one of the one or more data shipper agents. In an example embodiment, the automatic reconfiguration of the configuration of the at least one of the one or more data shipper agents includes setting types of the data to be collected by the at least one of the one or more data shipper agents.

In an example embodiment, the method 300 may further include monitoring a status of the one or more data shipper agents. The status may include one of the following: an enabled status, a disabled status, an error in an operation of the one or more data shipper agents, a version of the one or more data shipper agents, a last activity time, and so forth. Based on the status, a notification may be provided to the user. In an example embodiment, providing of the notification may include prompting the user to change the configuration parameters associated with the at least one of the one or more data shipper agents.

In an example embodiment, the central agent management unit may analyze the collected data. Upon determining that there is an issue related to the data, the central agent management unit may notify the user. For example, the central agent management unit may send a notification to the user to inform the user of malware in one of the programs running on the edge node, security issue related to a service running on the edge node, the edge node having issues with the performance and provide reasons as to why the performance has deteriorated. In further example embodiments, the central agent management unit may provide a health status of an operating system of the edge node or a health status of any program, software piece, service, or process running on the edge node.

In some embodiments, the user may address the issues mentioned in the notifications received from the central agent management unit. For example, the user may use the GUI to block malware, stop a suspicious process, or run a deep security check. In an example embodiment, the central agent management unit may provide recommendations to the user as to what data to collect. The central agent management unit may generate the recommendations based on the analysis of the collected data. The recommendations may include advise to protect a system associated with an edge node, collect more granular data, collect data with respect to further processes or services running on the edge node, and so forth. Therefore, the central agent management unit may provide the user with insight for all processes running on edge node and provide a recommendation concerning system performance and security protection.

The systems and methods of the present disclosure may relieve the user from the burden of determining which software tool to be run in order to collect specific types of data, as well as eliminate the need for configuring the software tools by configuring the software tools automatically. Additionally, systems and methods of the present disclosure allow less technical user to be in control of all processes running on the edge nodes of the user. Specifically, in conventional data monitoring systems, a user typically needs to understand how to run software programs on the backend of an edge node. With the systems and methods of the present disclosure, a user may control the processes running on the edge nodes via a GUI by simply selecting edge nodes, data shipper agents, and configuration parameters of the data shipper agents.

In an example embodiment, the GUI may provide a dashboard showing a list of all metrics collected by the data shipper agents from edge nodes for a period of time. The dashboard may further show logs and other types of data collected by the data shipper agents.

Figure 4:
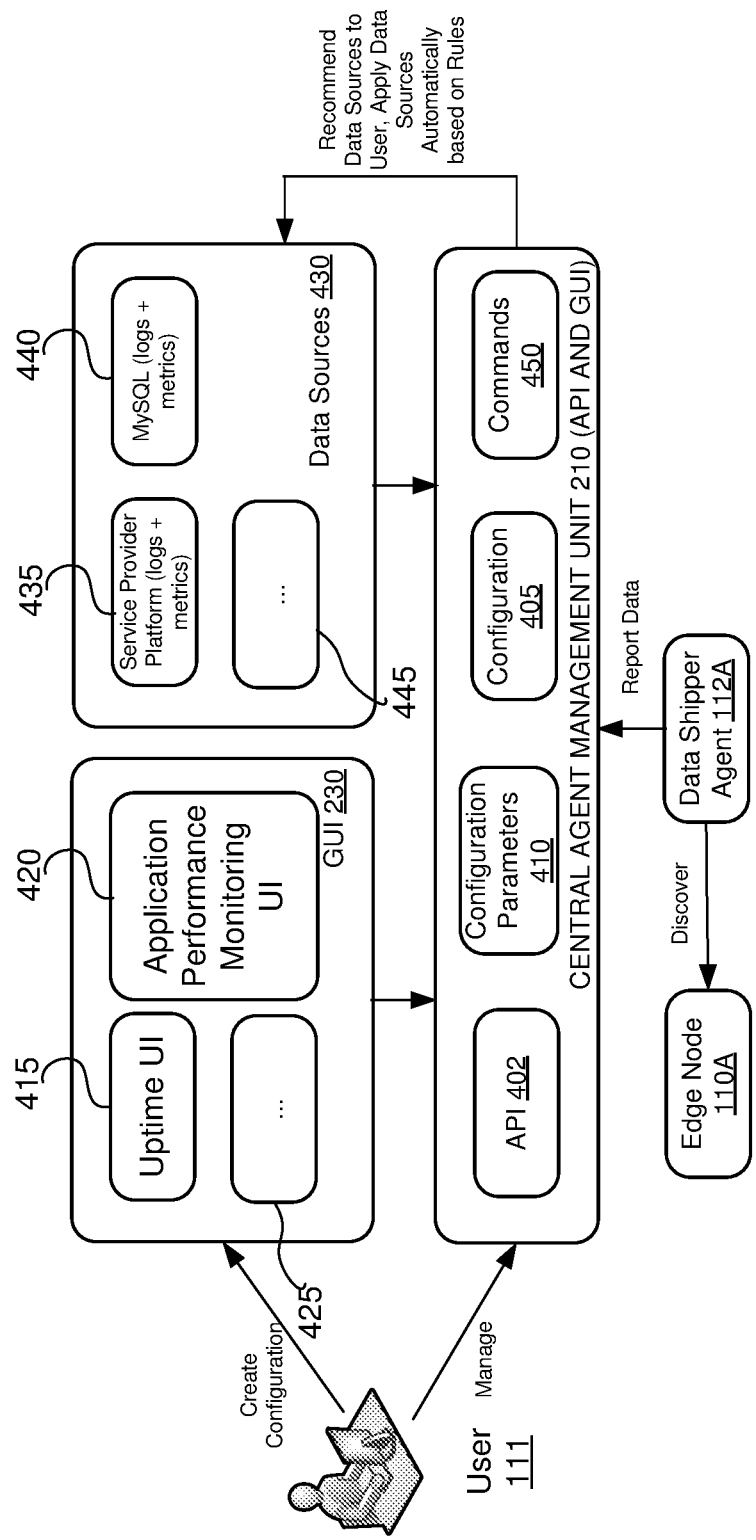
FIG. 4 is a block diagram showing configuring and managing data shipper agents by a user using a graphical user interface (GUI), according to an example embodiment.

FIG. 4 is a block diagram 400 showing configuring and managing data shipper agents by a user using a GUI of the system for configuring and managing data shipper agents, according to an example embodiment. A GUI 230 may be provided to a user 111 associated with an edge node 110A. A data shipper agent 112A may be running on the edge node 110A. The data shipper agent 112A may discover and collect data associated with the edge node 110A and report the collected data to a central agent management unit 210. The central agent management unit 210 of the system 200 may act as a single bi-directional point of policy control, administration, interactive queries, and security protections.

The user 111 may use the GUI 230 to monitor all processes running on the edge node 110A and change the configuration of the data shipper agent 112A as needed according to the types of data the user needs to be collected and tasks the user needs to perform based on the data.

The user 111 may select data sources 430 from which the data shipper agent 112A needs to collect data. The data sources 430 may include services 435 of a service provider platform running on the edge node 110A, MySQL 440 running on the edge node 110A, and other services, applications, and processes 445 running on the edge node 110A.

In an example embodiment, the GUI 230 may include an uptime user interface (UI) 415, an application performance monitoring UI 420, and other UIs 425. The uptime UI 415 may be used to monitor a status of edge nodes via HyperText Transfer Protocol (HTTP)/HyperText Transfer Protocol Secure (HTTPS), Transmission Control Protocol (TCP), and Internet Control Message Protocol (ICMP) and explore the status over time, drill into specific monitors, and view a high-level snapshot of a network environment at a selected point in time. The application performance monitoring UI 420 may be used to automatically collect in-depth performance metrics and errors from applications running on edge nodes.

The central agent management unit 210 may receive a list of data shipper agents installed on edge nodes associated with the user 111. In this embodiment, one data shipper agent 112A is running on one edge node 110A. The central agent management unit 210 may further store a configuration 405 of the data shipper agent 112A.

The user 111 may select, via the GUI 230, configuration parameters 410 associated with the data shipper agent 112A. The configuration parameters 410 may represent one or more tasks assigned to the data shipper agent 112A to be performed with respect to the edge node 110A. The central agent management unit 210 may receive and store the configuration parameters 410.

In an example embodiment, the central agent management unit 210 may monitor a status of the data shipper agent 112A and recommend one or more further data sources to user 111 from which the data shipper agent 112A needs to collect data. In an example embodiment, the recommendation may be further selected by the central agent management unit 210 based on the data collected by the data shipper agent 112A. Upon selecting the data sources by the user in response to the recommendation, the central agent management unit 210 may automatically apply changes to the configuration 405 of the data shipper agent 112A based on predetermined rules. The central agent management unit 210 may have an API 402 for reconfiguring the configuration 405 of the data shipper agent 112A.

In general, the central agent management unit 210 acts as bi-directional point of policy control, administration, interactive queries, and security protection between the GUI 230 provided to the user 111 and the API 402 enabling the reconfiguration of the data shipper agents. The central agent management unit 210 provides a secure communication channel between the data shipper agent 112A and the API 402. The central agent management unit 210 may further send commands 450 to the data shipper agent 112A or tasks run by the data shipper agent 112A. The command 450 may be include a command to update the tasks executed by the data shipper agent 112A.

Thus, the user 111 can configure the data shipper agent via the GUI 230, manage the configuration changes using the central agent management unit 210, deploy specific configurations to a plurality of data shipper agents, and use the GUI 230 to investigate any issues during the deployment of the configuration.

In an example embodiment, the central agent management unit 210 may provide, via the GUI 230, a status of data shipper agents to the user 111, such as an offline status, a successful deployment status, a deployment failure, and so forth.

The central agent management unit 210 may also display a list of tasks currently run by the data shipper agent 112A on the edge node 110A, schedule deployment of one or more further data shipper agents based on a time schedule, and enable the user 111 to apply the same configuration to a subset of data shipper agents. In a further example embodiment, central agent management unit 210 allows the user 111 to read the logs collected by the data shipper agent 112A via the GUI 230, display metrics information associated with the edge node 110A running the data shipper agent 112A, and provide a link between the running tasks/processes on the data shipper agent 112A and the collected monitoring data. In an example embodiment, the central agent management unit 210 may create alerts for the data shipper agent 112A based on the updated configuration.

In an example embodiment, the central agent management unit 210 may store a history of the changes for each configuration of data shipper agents and record audit logs for changes and users implementing the changes. The central agent management unit 210 further allows configuring a role-based access control of actions, data, and targets for the data shipper agents. The central agent management unit 210 can manage when and how a configuration is pushed to the data shipper agent.

In an example embodiment, the central agent management unit 210 can invoke an index lifecycle management via the GUI 230 UI for creating policies. The index lifecycle management may be used to automatically manage policies according to performance, resiliency, and retention requirements. In an example embodiment, the central agent management unit 210 may allow securely managing credentials and Secure Sockets Layer certificates.

The communication between the data shipper agent and a software piece (program, process, or service) that needs to be monitored is provided by using an HTTP server. The data shipper agent sends commands to the HTTP server and the HTTP server establishes a communication channel with the software piece and sends commands to the software piece. Similarly, the software piece sends the data to the HTTP server and the HTTP server sends the data received from the software piece to the data shipper agent.

In an example embodiment, the edge node on which the software piece is running may establish a connection with a remote HTTP server by using a handshake procedure. If the handshake procedure is not sufficient for the HTTP server to access software pieces of the edge node, a security certificate may be used for communications between the edge node and the HTTP server. The user of the edge node may need to provide the security certificate to the HTTP server so that the HTTP server can use this security certificate for communications with the edge node and for accessing the software piece running on the edge node.

Figure 5:
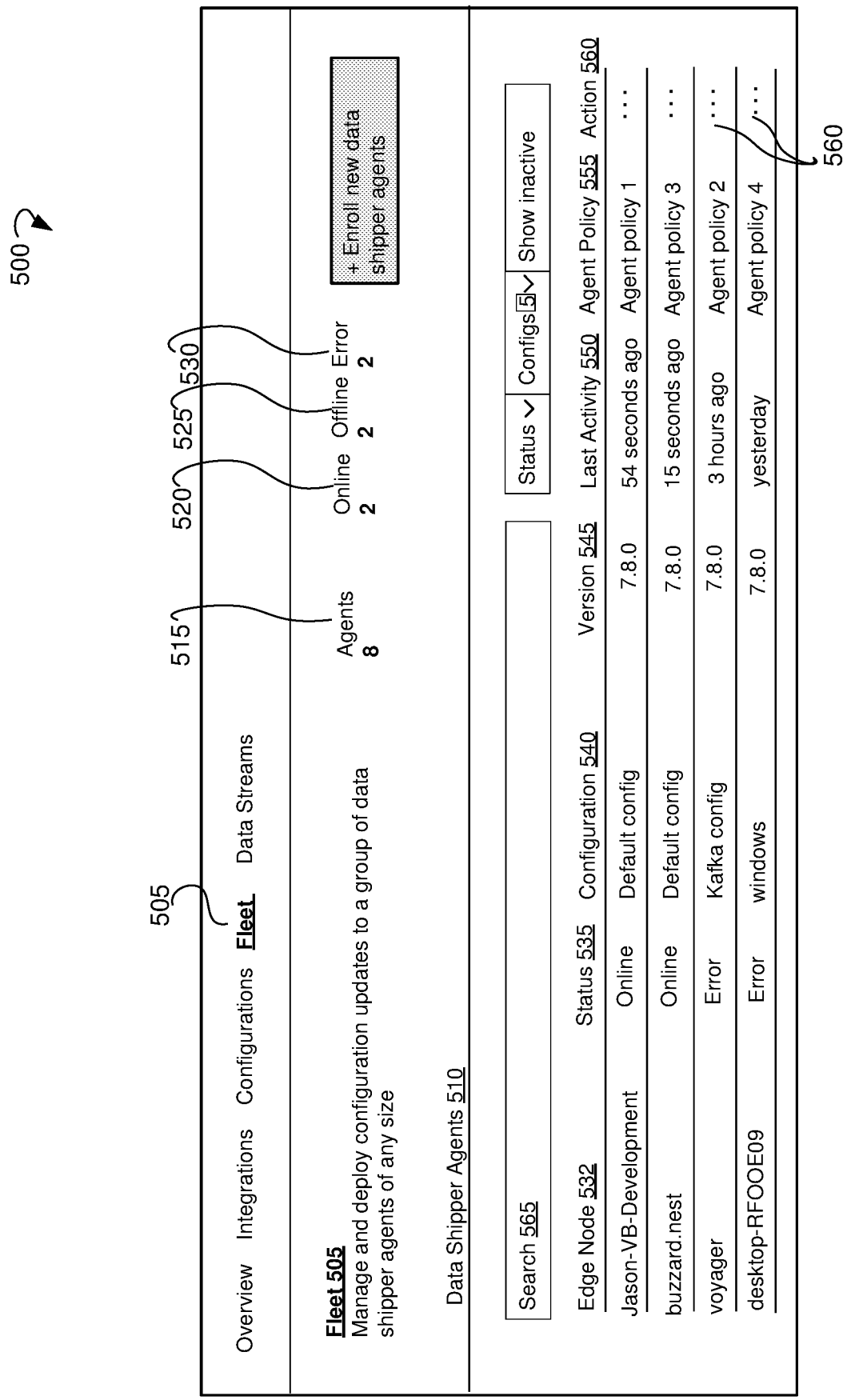
FIG. 5 is a GUI of a system for configuring and managing data shipper agents, according to an example embodiment.

FIG. 5 is an example GUI 500 of the system for configuring and managing data shipper agents, according to an example embodiment. The GUI 500 may provide, to a user, information concerning the health of data shipper agents running on edge nodes of the user. In FIG. 5, a group of data shipper agents is shown as fleet 505. All data shipper agents can be running the same version in the fleet, and each data shipper agent can be a member of a single fleet only. The user may utilize the GUI to manage and update the configuration of one or a group of data shipper agents of any size (e.g., hundreds or thousands of data shipper agents).

Upon selection of fleet 505 on the GUI 500, a list of data shipper agents 510 running on the edge nodes 532 may be shown to the user. One of data shipper agents 510 may be running on each of the edge nodes 532. The GUI 500 may also show a total number 515 of the data shipper agents 510 running on the edge node, a total number 520 of data shipper agents 510 having an online status, a total number 525 of data shipper agents 510 having an offline status, a total number 530 of data shipper agents 510 having an error status, and the like. The GUI 500 may also show, for each data shipper agent 510, an edge node 532, a status 535, a configuration 540, a version 545, and last activity time 550. The user may also search for a data shipper agent using a search line 565.

When the user wants to reconfigure or manage one or more of the data shipper agents 510, the user may select an action button 560 associated with the data shipper agent that the user wants to reconfigure or manage.

In an example embodiment, the configuration language used for generating configurations of data shipper agents can be unified. Furthermore, data storage format for storing data collected by multiple data shipper agents from multiple edge nodes can be unified. Due to the unified format of the configuration and data, the configuration and data stored in a storage may be easily retrievable from the storage for further processing or presenting to the user.

FIG. 6 is an example GUI 600 of the system for configuring and managing data shipper agents, according to an example embodiment. The GUI 600 may provide a list of agent policies 605 to the user. The user may utilize the agent policies 605 to manage data shipper agents and data to be collected by the data shipper agents.

The GUI 600 can be used to show a name 610 of an agent policy, last update time 615, a total number 620 of data shipper agents to which the agent policy is applied, a total number 625 of data sources integrated for each data shipper agent, and an action 630 to be performed with respect to the agent policy. The user may also search for any needed agent policy using a search line 635.

FIG. 7 is an example GUI 700 of the system for configuring and managing data shipper agents, according to an example embodiment. The GUI 700 may be opened upon selection of an action button 560 related to a particular data shipper agent shown in FIG. 5 or upon selection of an action button 630 related to a particular agent policy shown in FIG. 6.

At step 1 702, the GUI 700 can enable the user to search for and select a configuration the user wants to change. The default configuration 705 can be applied to multiple data shipper agents running on different edge nodes associated with the user to facilitate management of the configuration at scale. At step 2 704, the user may select a data source 710 from which the data shipper agent needs to collect data. An example data source include Amazon Web Services (AWS) running on the edge node.

At step 3 712, the user may change the setting of the data source by providing a name 715 and description 720 of the data source. The user may further select configuration parameters associated with the data shipper agent, for example, by selecting data that need to be collected by the data shipper agent. For example, the user may opt to collect logs from AWS instances by selecting a button 725 (checkbox) and/or to collect metrics from AWS instances by selecting a button 730 (checkbox). The metrics of AWS instances may include core metrics 735, CPU metrics 740, entropy metrics 745, and so forth. The user may also set a period for collecting the metrics, e.g., 10 seconds.

After the user selects a save button 750, the GUI 700 provides the selections made by user to the central agent management unit. Upon receipt of the configuration parameters corresponding to the selection made by the user, the central agent management unit may automatically change an agent policy of the data shipper agent by reconfiguring the configuration of the data shipper agent in the agent policy. The data shipper agent may check in for the latest updates of the agent policy on a regular basis.

In an example embodiment, any number of data shipper agents may have the same configuration, which allows the user to scale up the configuration to data shipper agents on thousands of edge nodes. When the user makes a change to the configuration of the data shipper agent, all other data shipper agents that run on other edge nodes and have the same configuration receive the update to the configuration.

Therefore, the user no longer needs to distribute configuration updates by himself to each edge node.

Therefore, configuring and managing data shipper agents using the systems and methods of the present disclosure provides a user with a quick visibility into a status of a plurality of data shipper agents running on different edge nodes, enables the user to update agent policies and configuration of the data shipper agents remotely and manage data shipper agents at scale (e.g., manage thousands of data shipper agents). Moreover, due to the deep visibility to a status of data shipper agents provided by the systems and methods of the present disclosure, the user is able to resolve issues as soon as it is discovered that data shipper agents are not running correctly.

FIG. 8 is a diagrammatic representation of an example machine in the form of a computer system 800, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be, for example, a base station, a personal computer (PC), a tablet PC, a personal digital assistant (PDA), a cellular telephone, a portable music player (e.g., a portable hard drive audio device such as a Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within static memory 15 and/or within the processors 5 during execution thereof by the computer system 1. The main memory 10, static memory 15, and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, section, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

Thus, various embodiments of methods and systems for configuring and managing data shipper agents have been described. Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense. There are many alternative ways of implementing the present technology. The disclosed examples are illustrative and not restrictive.

What is claimed is:

1. A method for configuring and managing data shipper agents, the method comprising:
  receiving a list of one or more data shipper agents installed on one or more edge nodes associated with a user, the data shipper agents configured to collect multiple types of data from other network machines related to processes running on the one or more edge nodes;

providing a graphical user interface (GUI), the GUI enabling the user to configure the one or more data shipper agents;

receiving, via the GUI, from the user, selections of configuration parameters associated with at least one of the one or more data shipper agents, the configuration parameters representing one or more tasks assigned to the at least one of the one or more data shipper agents;

monitoring a status of the one or more data shipper agents;

based on the monitoring, providing a notification to the user prompting the user to change the configuration parameters associated with the at least one of the one or more data shipper agents;

receiving a configuration of the at least one of the one or more data shipper agents, the configuration being reconfigurable through the GUI using a configuration application programming interface (API), wherein a first portion of data to be collected by the at least one of the one or more data shipper agents is set in the configuration;

analyzing the first portion of data and generating a plurality of recommendations based on the analyzing, the plurality of recommendations comprising advice to collect a second portion of more granular data connected to processes or services running on the one or more edge nodes to provide the user with details relevant to any processes running on the one or more edge nodes and with recommendations from the plurality of recommendations concerning both increasing system performance and improving security protection;

receiving, via the GUI, from the user, a change to the selections of configuration parameters associated with the at least one of the one or more data shipper agents in response to the plurality of recommendations; and based on the configuration parameters, automatically reconfiguring the configuration of the at least one of the one or more data shipper agents.

2. The method of claim 1, wherein the at least one of the one or more data shipper agents is configured to collect data from one of the one or more edge nodes and provide the data to a service provider platform.

3. The method of claim 2, wherein the data collected by the at least one of the one or more data shipper agents include at least one of log file data, metric data, trace data, network data, event log data, audit data, uptime monitoring data, serverless shipper data, synthetic data, or security data.

4. The method of claim 2, wherein the data to be collected by the at least one of the one or more data shipper agents are set in the configuration of the at least one of the one or more data shipper agents.

5. The method of claim 2, wherein the automatically reconfiguring the configuration includes setting types of the data to be collected by the at least one of the one or more data shipper agents.

6. The method of claim 2, further comprising providing, by the service provider platform, one or more services with respect to the one or more edge nodes using the data collected by the at least one of the one or more data shipper agents.

7. The method of claim 1, wherein the status includes one of the following: an enabled status, a disabled status, an error in an operation of the one or more data shipper agents, a version of the one or more data shipper agents, and a last activity time.

8. The method of claim 1, wherein the receiving the selections of the configuration parameters includes:

receiving selections of one or more policies associated with the at least one of the one or more data shipper agents; and for each of the one or more policies, receiving the selections of the configuration parameters.

9. A system for configuring and managing data shipper agents, the system comprising:

a memory;

a central agent management unit coupled to and in communication with the memory, the central agent management unit being configured to:

receive a list of one or more data shipper agents installed on one or more edge nodes associated with a user, the data shipper agents configured to collect multiple types of data from other network machines related to processes running on the one or more edge nodes;

provide a graphical user interface (GUI), the GUI being configured to enable the user to configure the one or more data shipper agents;

receive, via the GUI, from the user, selections of configuration parameters associated with at least one of the one or more data shipper agents, the configuration parameters representing one or more tasks assigned to the at least one of the one or more data shipper agents;

monitor a status of the one or more data shipper agents;

based on the monitoring, provide a notification to the user prompting the user to change the configuration parameters associated with the at least one of the one or more data shipper agents;

receive a configuration of the at least one of the one or more data shipper agents, the configuration being reconfigurable through the GUI using a configuration application programming interface (API), wherein a first portion of data to be collected by the at least one of the one or more data shipper agents is set in the configuration;

analyze the first portion of data and generate a plurality of recommendations based on the analyze step, the plurality of recommendations comprising advice to collect a second portion of more granular data connected to processes or services running on the one or more edge nodes to provide the user with details relevant to any processes running on the one or more edge nodes and with recommendations from the plurality of recommendations concerning both increasing system performance and improving security protection;

receive, via the GUI, from the user, a change to the selections of configuration parameters associated with the at least one of the one or more data shipper agents in response to the plurality of recommendations; and based on the configuration parameters, automatically reconfigure the configuration of the at least one of the one or more data shipper agents.

10. The system of claim 9, wherein the at least one of the one or more data shipper agents is configured to collect data from one of the one or more edge nodes and provide the data to a service provider platform.

11. The system of claim 10, wherein the data collected by the at least one of the one or more data shipper agents includes at least one of log file data, metric data, trace data, network data, event log data, audit data, uptime monitoring data, serverless shipper data, synthetic data, or security data.

12. The system of claim 10, wherein the data to be collected by the at least one of the one or more data shipper agents are set in the configuration of the at least one of the one or more data shipper agents.

13. The system of claim 10, wherein the automatically reconfigure the configuration step includes setting types of the data to be collected by the at least one of the one or more data shipper agents.

14. The system of claim 9, wherein the status includes one of the following: an enabled status, a disabled status, an error in an operation of the one or more data shipper agents, a version of the one or more data shipper agents, and a last activity time.

15. The system of claim 9, wherein the receive the selections of the configuration parameters step includes:
   receiving selections of one or more policies associated with the at least one of the one or more data shipper agents; and
   for each of the one or more policies, receiving the selections of the configuration parameters.

16. A system for configuring and managing data shipper agents, the system comprising:
   a memory;
   a central agent management unit coupled to and in communication with the memory, the central agent management unit being configured to:
      receive a list of one or more data shipper agents installed on one or more edge nodes associated with a user, wherein the one or more data shipper agents is configured to collect data from other network machines related to processes running on the one or more edge nodes and provide the data to a service provider platform;
      provide a graphical user interface (GUI), the GUI being configured to enable the user to configure the one or more data shipper agents;
      receive, via the GUI, from the user, selections of configuration parameters associated with at least one of the one or more data shipper agents, each of the configuration parameters representing one or more tasks assigned to the at least one of the one or more data shipper agents;
      monitor a status of the one or more data shipper agents;
      based on the monitoring, provide a notification to the user prompting the user to change the configuration parameters associated with the at least one of the one or more data shipper agents;
      receive a configuration of the at least one of the one or more data shipper agents, the configuration being reconfigurable through the GUI using a configuration application programming interface (API), wherein a first portion of data to be collected by the at least one of the one or more data shipper agents is set in the configuration;
      analyze the first portion of data and generate a plurality of recommendations based on the analyzing, the plurality of recommendations comprising advice to collect a second portion of more granular data connected to processes or services running on the one or more edge nodes to provide the user with details relevant to any processes running on the one or more edge nodes and with recommendations from the plurality of recommendations concerning both increasing system performance and improving security protection;
      receive, via the GUI, from the user, a change to the selections of configuration parameters associated with the at least one of the one or more data shipper agents in response to the plurality of recommendations; and
      based on the configuration parameters, automatically reconfigure the configuration of the at least one of the one or more data shipper agents, wherein the data to be collected by the at least one of the one or more data shipper agents are set in the configuration of the at least one of the one or more data shipper agents;
   wherein the service provider platform including the central agent management unit is configured to:
      receive, from the one or more data shipper agents, data collected by the one or more data shipper agents from the one or more edge nodes; and
      provide one or more services with respect to the one or more edge nodes using the data collected by the one or more data shipper agents.

* * * * *